United States Patent
Ha

(10) Patent No.: US 11,296,530 B2
(45) Date of Patent: Apr. 5, 2022

(54) METHOD FOR CHARGING BATTERY AT LOW TEMPERATURE

(71) Applicants: Hyundai Motor Company, Seoul (KR); Kia Motors Corporation, Seoul (KR)

(72) Inventor: Dong Gil Ha, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 190 days.

(21) Appl. No.: 16/423,932

(22) Filed: May 28, 2019

(65) Prior Publication Data

US 2020/0185928 A1    Jun. 11, 2020

(30) Foreign Application Priority Data

Dec. 5, 2018  (KR) .................. 10-2018-0154898

(51) Int. Cl.
| | |
|---|---|
| *H02J 7/00* | (2006.01) |
| *B60L 58/27* | (2019.01) |
| *B60L 53/62* | (2019.01) |

(52) U.S. Cl.
CPC .............. *H02J 7/007* (2013.01); *B60L 53/62* (2019.02); *B60L 58/27* (2019.02)

(58) Field of Classification Search
CPC ... H02J 7/00; H02J 7/007; B60L 58/27; B60L 53/62
USPC ...................................................... 320/150
See application file for complete search history.

(56) References Cited

U.S. PATENT DOCUMENTS

| | | | | |
|---|---|---|---|---|
| 8,847,544 | B2 * | 9/2014 | Ang ...................... | B60L 50/51 320/104 |
| 2009/0295334 | A1 * | 12/2009 | Yang ..................... | H02J 7/0031 320/134 |
| 2012/0039005 | A1 * | 2/2012 | Kanakubo ............. | H02H 3/087 361/59 |
| 2012/0217934 | A1 * | 8/2012 | Zhou ..................... | H01M 10/44 320/136 |
| 2013/0086404 | A1 * | 4/2013 | Sankar ................. | H02J 13/0003 713/324 |
| 2014/0095092 | A1 * | 4/2014 | Ikeda .................... | H01M 10/48 702/63 |
| 2016/0059733 | A1 * | 3/2016 | Hettrich ............... | H04W 4/029 701/2 |
| 2016/0126760 | A1 * | 5/2016 | Murata ................. | B60L 1/02 320/107 |
| 2017/0057376 | A1 * | 3/2017 | Murata ................. | B60L 58/27 |
| 2017/0120775 | A1 * | 5/2017 | Murata ................. | B60W 10/26 |
| 2017/0207651 | A1 * | 7/2017 | Geng .................... | H01M 10/44 |
| 2018/0281618 | A1 * | 10/2018 | Ogaki ................... | H01M 10/443 |

FOREIGN PATENT DOCUMENTS

| | | |
|---|---|---|
| KR | 10-2014-0010664 A | 1/2014 |
| KR | 10-2015-0059246 A | 6/2015 |

\* cited by examiner

*Primary Examiner* — Richard Isla
*Assistant Examiner* — Dung V Bui
(74) *Attorney, Agent, or Firm* — Mintz Levin Cohn Ferris Glovsky and Popeo, P.C.; Peter F. Corless

(57) ABSTRACT

A method for charging a battery at a low temperature in a battery system is provided. The system includes a charger that provides power for charging the battery and a temperature-increasing device that generates heat using the power provided from the charger to increase a temperature of the battery.

10 Claims, 4 Drawing Sheets

| TEMPERATURE | ... | -25°C | -20°C | ... | 0°C | ... | 20°C | 25°C | ... |
|---|---|---|---|---|---|---|---|---|---|
| CHARGING ALLOWABLE CURRENT | | | | | | | | | |
| CHARGING UPPER LIMIT VOLTAGE | | | | | | | | | |
| TEMPERATURE-RISING TARGET TEMPERATURE | | | | | | | | | |
| TEMPERATURE-RISING TIME | | | | | | | | | |

FIG. 2

METHOD FOR CHARGING BATTERY AT LOW TEMPERATURE

CROSS REFERENCE TO RELATED APPLICATION

The present application claims priority of Korean Patent Application No. 10-2018-0154898 filed on Dec. 5, 2018, the entire contents of which is incorporated herein for all purposes by this reference.

BACKGROUND

Field of the Disclosure

The present disclosure relates to a system and method for charging a battery at a low temperature, and more particularly, to a method for charging a battery at a low temperature to perform optimal charging by minimizing a charging delay due to an insufficient battery charging current by a temperature-increasing device when the temperature-increasing device is used to improve battery charging efficiency in low temperature environment.

Description of the Related Art

As problems of global warming, environmental pollution or the like increase, research and development of eco-friendly vehicles to reduce environmental pollution are being actively conducted even in the automobile industry field, and a market of the eco-friendly vehicles is gradually expanding. Eco-friendly vehicles include electric vehicles, hybrid vehicles and plug-in hybrid vehicles using a motor that generates a driving force using electric energy instead of an engine that generates a driving force by burning the existing fossil fuels. Among the eco-friendly vehicles using the electric energy, the electric vehicle and the plug-in hybrid vehicle are supplied with power from an external charging facility connected to a grid to charge the battery within the vehicle and produce kinetic energy required to drive the vehicles using power charged in the battery.

However, the battery of the vehicle has decreased charging efficiency such as a decrease in a charging speed, a decrease in a charge amount, and the like at a low temperature. To improve battery charging performance at a low temperature, a temperature-increasing device used to increase the temperature of the battery by generating heat using a part of the current supplied from the charger to the battery is installed within the vehicle. When the battery is charged, a battery management system (BMS) increases the temperature of the battery using a temperature-increasing device that generates heat using the current supplied from the charger up to a predetermined temperature-increasing target temperature based on the current temperature. Typically, the temperature-increasing target temperature is preset in advance based on an experimental method to a temperature at which the charge amount may be maximized based on the temperature of the battery at the start of charging.

In addition, the charging allowable current and the charging upper limit voltage provided to the battery by temperature of battery are also determined and stored in advance based on the experimental method, and the battery management system transmits a current command and a voltage command to the charger based on the charging allowable current and the charging upper limit voltage by temperature of the battery to adjust charging. At this time, since the temperature-increasing device is supplied with energy from the charger during charging, when the temperature-increasing device is used excessively, the energy capable of charging the battery is disadvantageously decreased and the charging speed is decreased accordingly. However, according to the related art, there are no suitable technologies capable of minimizing the battery charging time by appropriately adjusting the charging of the battery based on the energy used in the temperature-increasing device.

The contents described as the related art have been provided merely for assisting in the understanding for the background of the present disclosure and should not be considered as corresponding to the related art known to those skilled in the art.

SUMMARY

Accordingly, the present disclosure provides a battery charging method capable of optimizing a charging time by preventing charging of a battery from being delayed due to power consumed in a temperature-increasing device at the time of low temperature charging of the battery.

According to an exemplary embodiment of the present disclosure, a method for charging a battery at a low temperature in a battery system including a charger configured to provide power for charging the battery and a temperature-increasing device configured to generate heat using the power provided from the charger to increase a temperature of the battery, the method may include: receiving the temperature of the battery, a state of charge (SOC) of the battery, and a targeted state of charge of the battery when the charging of the battery begins; confirming a temperature-increasing target temperature of the battery based on the temperature of the battery and confirming a charging allowable current capable of being provided to the battery at the temperature-increasing target temperature; and comparing a sum of the charging allowable current at the temperature-increasing target temperature and a temperature-increasing consumption current of the temperature-increasing device at the temperature-increasing target temperature with a magnitude in a possible supply current of the charger.

The method may further include estimating a first temperature at which the current capable of being provided to the battery is less than a preset charging allowable current by temperature based on the comparison result; and determining a time when an operation of the temperature-increasing device is turned off based on a comparison result of the state of charge of the battery when the battery is charged up to the first temperature and the state of charge of the battery when the battery is charged up to the charging target temperature with the targeted state of charge and calculating a charging time required when the battery is charged up to the targeted state of charge.

The method may further include: receiving and storing information in advance regarding the charging allowable current and a charging upper limit voltage capable of being provided to the battery by temperature of the battery when the battery is charged, the temperature-increasing target temperature, and the temperature-increasing time required to raise the unit temperature when the temperature-increasing device is operated based on the temperature of the battery.

As the comparison result, when the sum of the charging allowable current of the battery and the current consumed by the temperature-increasing device at the temperature-increasing target temperature exceeds the current capable of being supplied by the charger, the sum of the charging allowable current and the temperature-increasing consumption current of the temperature-increasing device may be compared with the magnitude in the possible supply current of the charger at a temperature reduced by the unit temperature from the temperature-increasing target temperature. Additionally, a temperature at which the sum of the charging allowable current and the temperature-increasing consumption current of the temperature-increasing device is less than the magnitude in the possible supply current of the charger may be determined.

In the estimating of the first temperature, a temperature obtained by adding the temperature at which the sum of the charging allowable current and the temperature-increasing consumption current of the temperature-increasing device is less than the magnitude of the possible supply current of the charger to the unit temperature may be determined as the first temperature. The temperature-increasing consumption current may be derived by dividing a predetermined temperature-increasing power of the temperature-increasing device by the predetermined charging upper limit voltage of the battery.

Further, the method may include predicting a first charge amount and a first state of charge of the battery corresponding to a case in which the battery is charged up to the first temperature and a second charge amount and a second state of charge of the battery corresponding to a case in which the battery is charged up to the charging target temperature; comparing the first state of charge and the second state of charge with the targeted state of charge; first determining a turn off time of the temperature-increasing device as a charging ending time when the targeted state of charge is less than the first state of charge; second determining the temperature of the turn off time of the temperature-increasing device as a time when the temperature of the battery reaches the first temperature when the targeted state of charge is greater than or equal to the first state of charge or less than the second state of charge; and third determining the turn off time of the temperature-increasing device as a time when the temperature of the battery reaches the targeted temperature-increasing temperature when the targeted state of charge is greater than or equal to the second state of charge.

In the predicting of a first charge amount and a first state of charge of the battery, the first charge amount may be calculated by summing values obtained by multiplying the temperature-increasing time by the charging allowable current, respectively when the predetermined temperature-increasing device is operated based on the received first temperature. The first state of charge may be calculated by calculating a ratio of the first charge amount to a total capacity of the battery as percentage and adding the calculated ratio to the received state of charge of the battery.

Additionally, the second charge amount may be calculated by summing values obtained by multiplying the temperature-increasing time by the charging allowable current, respectively when the predetermined temperature-increasing device from the first temperature to the temperature-increasing target temperature is operated and then adding the summed value to the first charge amount. The second state of charge may be calculated by calculating a ratio of the second charge amount to the total capacity of the battery as the percentage and adding the calculated ratio to the state of charge of the battery received in the receiving.

In the first determination, a targeted charge amount corresponding to a value obtained by subtracting the state of charge of the battery received from the targeted state of charge may be calculated, and a value obtained by multiplying the charging allowable current at the corresponding temperature of the temperature-increasing time by temperature of the battery when the predetermined temperature-increasing device is operated while increasing the temperature value of the battery received may be accumulated, and a total of accumulated time up to a temperature at which the accumulated value starts exceeding the targeted charge amount may be calculated as a predicted charging time.

In the second determination, a targeted charge amount corresponding to a value obtained by subtracting the state of charge of the battery received from the targeted state of charge may be calculated, and values obtained by multiplying the charging allowable current at the corresponding temperature of the temperature-increasing time by temperature of the battery when the predetermined temperature-increasing device is operated while increasing the temperature value of the battery received may be accumulated, and a total of accumulated time up to a temperature at which the accumulated value starts exceeding the targeted charge amount may be calculated as a predicted charging time.

In the third determination, a targeted charge amount corresponding to a value obtained by subtracting the state of charge of the battery received from the targeted state of charge may be calculated, a first accumulated value may be generated by accumulating a value obtained by multiplying the charging allowable current at the corresponding temperature of the temperature-increasing time by temperature of the battery when the predetermined temperature-increasing device is operated while increasing the temperature value of the battery received to a first temperature. A second accumulated value may be generated by adding to the first accumulated value, a value obtained by multiplying the charging allowable current at the first temperature by a value obtained by adding the temperature-increasing time of a temperature from the first temperature to the temperature-increasing target temperature. A third accumulated value may be generated by accumulating values obtained by multiplying the charging allowable current at the corresponding temperature by the temperature-increasing time while increasing the temperature value of the temperature-increasing target temperature by the second accumulated value, and a total of accumulated time up to a temperature at which the third accumulated value starts exceeding the targeted charge amount may be calculated as a predicted charge time.

BRIEF DESCRIPTION OF THE DRAWINGS

The above and other objects, features and advantages of the present disclosure will be more clearly understood from the following detailed description taken in conjunction with the accompanying drawings, in which:

FIG. 2 is a diagram showing an example of a data map showing an example of predetermined battery temperature-related data used in the battery charging method at a low temperature according to an exemplary embodiment of the present disclosure.

DETAILED DESCRIPTION

Figure 1:
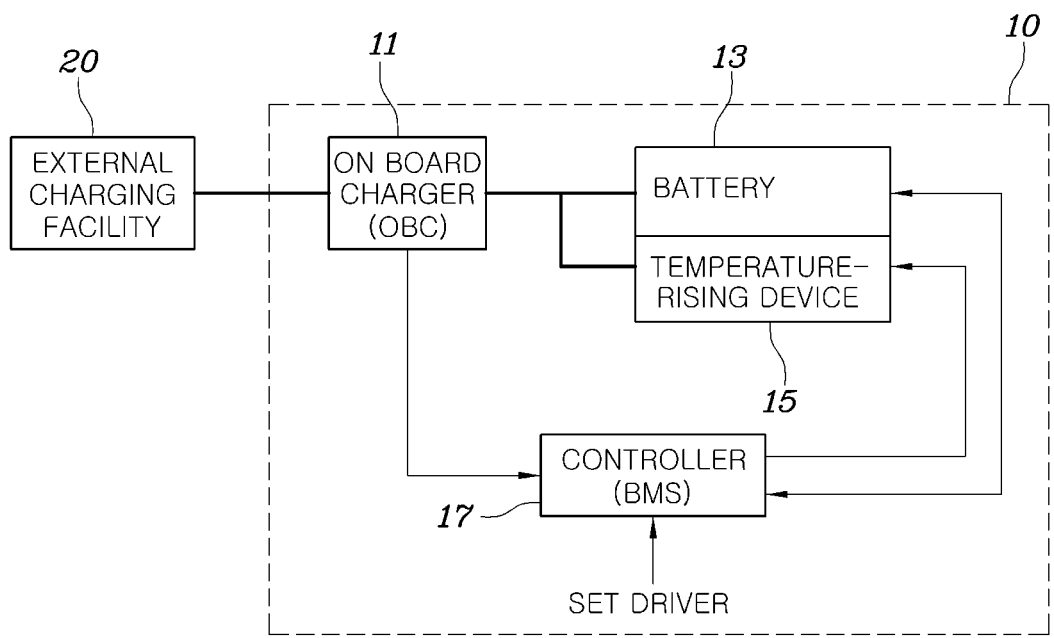
FIG. 1 is a block configuration diagram of a system to which a battery charging method at a low temperature according to an exemplary embodiment of the present disclosure is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a battery charging method at a low temperature according to various exemplary embodiments of the present disclosure will be described with reference to the accompanying drawings.

FIG. 1 is a block configuration diagram of a system to which a battery charging method at a low temperature according to an exemplary embodiment of the present disclosure is applied. As shown in FIG. 1, in a system to which a battery charging method at low temperature according to an exemplary embodiment of the present disclosure is applied, a vehicle 10 configured to secure power for driving a motor by charging the battery with power supplied from the outside like an electric vehicle and a plug-in hybrid vehicle may include: an on board charger (OBC) 11 supplied with alternating current (AC) power from a battery 13 and an external charging facility 20 and configured to convert the AC power into direct-current (DC) power having a voltage level capable of charging the battery 13; a temperature-increasing device 15 configured to generate heat to heat the battery 13 (e.g., increase the temperature of the battery) at a low temperature; and a controller 17 configured to monitor a state of the battery 13 (state of charge SOC), turn the temperature-increasing device 15 on and off, and adjusting a voltage and a current of the on board charger 11.

The battery charging method at a low temperature according to an exemplary embodiment of the present disclosure may be executed by the controller 17. In the actual vehicle, the controller 17 may be a battery management system (BMS). The controller 17 may include a processor in which a control operation performed in several exemplary embodiments of the present disclosure is programmed in advance and a memory in which information required in the control operation performed in several exemplary embodiments of the present disclosure is stored in advance or information derived in the control operation is stored.

Since the real-time information required by the controller 17, that is, temperature of the battery, a magnitude in the battery charging current, the battery charging voltage, and the like may be obtained by various types of sensors well known in the art, the various sensors are not illustrated in FIG. 1. In particular, the controller 17 may be configured to store charging-related information based on temperature of the battery derived in advance by the experimental method.

FIG. 2 is a diagram showing an example of a data map showing an example of predetermined battery temperature-related data used in the battery charging method at a low temperature (e.g., less than a range of about 25 to 35 C) according to an exemplary embodiment of the present disclosure. Referring to FIG. 2, the battery temperature-related charge information stored in advance by the controller 17 may include a charging allowable current, a charging upper limit voltage, a temperature-increasing target temperature, and a temperature-increasing time.

The charging allowable current refers to the magnitude in current capable of being supplied to the battery 13 based on temperature of the battery, which may be determined in advance in the battery manufacturing step in accordance with the specification of the battery 13. The charging upper limit voltage refers to the maximum magnitude in voltage capable of being supplied to the battery 13 based on temperature of the battery, which may also be determined in advance in the battery manufacturing step in accordance with the specification of the battery 13.

The temperature-increasing target temperature refers to a temperature-increasing target temperature based on the temperature of the battery at a start of charging the battery, and refers to a target temperature at which the maximum charging current may be supplied to the battery 13 in a shortest period of time. This may be determined in advance by the experimental method. The temperature-increasing time refers to a time required for increasing the temperature of the battery 13 by a unit temperature (e.g., about 5° C. in FIG. 2) when the charging allowable current is supplied to the battery 13 and the temperature-increasing device is operated.

For example, when the temperature-increasing time corresponding to about −25° C. is determined to be about 3 minutes in the table of FIG. 2, this indicates that it takes about 3 minutes to increase the temperature of the battery from about −25° C. to −20° C. when the temperature-increasing device 15 is operating during the battery charging. Such a temperature-increasing time may be determined in advance by the experimental method. On the other hand, the temperature-increasing time may be determined by performing modeling and a corresponding modeling formula to derive the temperature-increasing time in advance by the experimental method instead of the table format as shown in FIG. 2.

Figure 3:
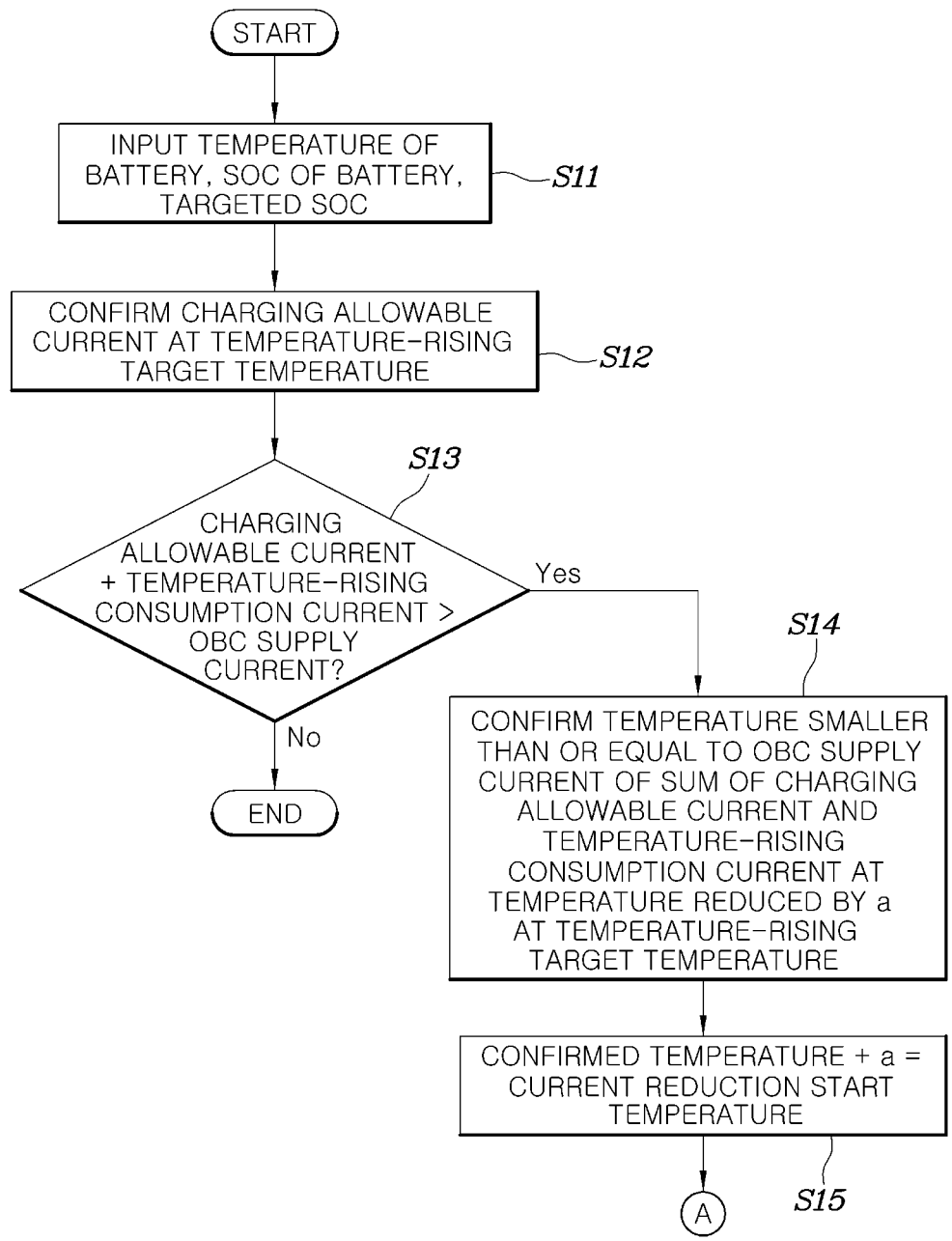
FIGS. 3 and 4 are flowcharts showing the battery charging method according to an exemplary embodiment of the present disclosure.
Figure 4:
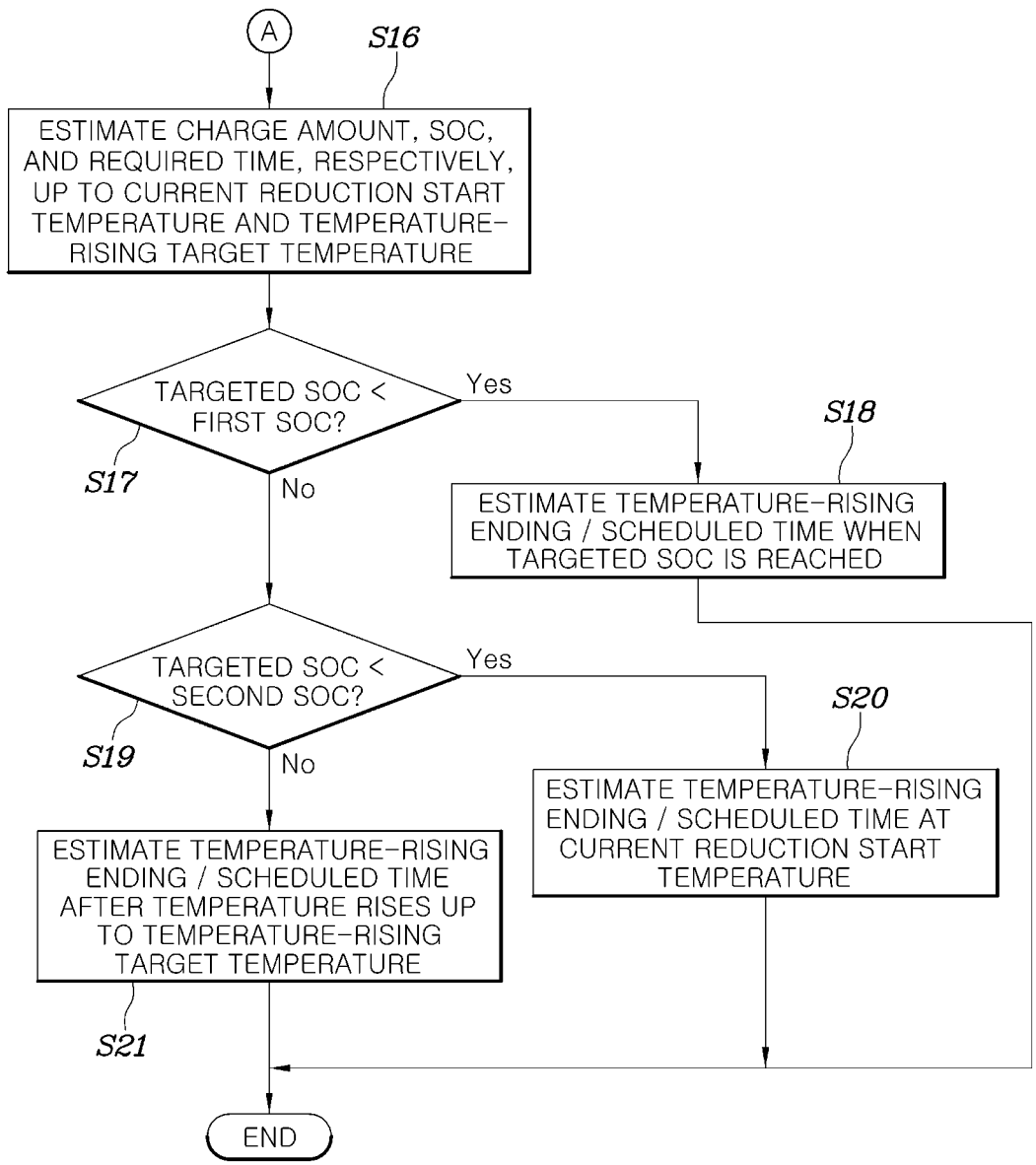

FIGS. 3 and 4 are flowcharts showing the battery charging method according to an exemplary embodiment of the present disclosure. Referring to FIG. 3, when the battery charging is started, the controller 17 may be configured to receive or calculate and confirm information regarding the state of the battery 13 such as the temperature of the battery 13 and the state of charge (SOC) of the battery and information regarding the targeted state of charge and the like input through an input device installed within a self-driving vehicle (S11).

Further, the controller 17 may be configured to confirm the temperature-increasing target temperature based on the collected temperature of the battery 13 using the pre-stored table as shown in FIG. 2, and confirm the charging allowable current at the temperature-increasing target temperature (S12). The controller 17 may then be configured to compare a sum of the charging allowable current at the temperature-increasing target and a temperature-increasing consumption current required for the temperature-increasing device 15 to operate with the magnitude in current capable of being supplied by the on board charger (OBC) 11 (S13).

Particularly, the temperature-increasing consumption current may be determined by the temperature-increasing power corresponding to the energy consumed in the heat generation of the predetermined temperature-increasing device 15 and the voltage of the battery 13. In other words, the temperature-increasing consumption current may be derived from the temperature-increasing target temperature by dividing the charging upper limit voltage at the temperature corresponding to the temperature-increasing target temperature by the temperature-increasing power of the predetermined temperature-increasing device 15 using the table of FIG. 2.

In addition, the OBC supply current capable of being supplied by the OBC 11 may be regarded as the maximum magnitude in current capable of being supplied by the OBC according to the OBC specification. In other words, in step S13, the controller 17 may be configured to determine whether the sum of the charging current capable of being supplied to the battery 13 at the temperature-increasing target temperature and the current consumed by the temperature-increasing device 15 exceeds the current capable of being supplied by the OBC 11.

When the sum of the charging current capable of being supplied to the battery 13 at the temperature-increasing target temperature and the current consumed by the temperature-increasing device 15 is less than or equal to the current capable of being supplied by the OBC 11, even though the temperature-increasing device 15 operates up to the temperature-increasing target temperature, the case where the current supplied to the battery 13 is reduced by the current used in the temperature-increasing device 15 does not occur, and thus, the temperature-increasing device 15 may not require operation.

However, when the sum of the charging current capable of being supplied to the battery 13 at the temperature-increasing target temperature and the current consumed by the temperature-increasing device 15 is greater than the current capable of being supplied by the OBC 11, the current supplied to the battery 13 by the temperature-increasing consumption current before reaching the temperature-increasing target temperature is less than the charging allowable current. Therefore, when the sum of the charging current capable of being supplied to the battery 13 at the temperature-increasing target temperature and the current consumed by the temperature-increasing device 15 is greater than the current that can be supplied by the OBC 11, the step S12 and the step S13 as described above may be repeated at a temperature reduced by unit temperature from the temperature-increasing target temperature to determine the temperature at which the sum of the charging current capable of being supplied to the battery 13 at the temperature-increasing target temperature and the current consumed by the temperature-increasing device 15 is less than or equal to the current capable of being supplied by the OBC 11 (S14).

Particularly, the unit temperature indicates the magnitude in the temperature change shown in the table as shown in FIG. 2 and thus, the charging allowable current or the like may be confirmed at the corresponding temperature. In other words, in FIG. 2, the unit temperature may be about 5° C. However, this unit temperature is merely an example, and the unit temperature may be selected as a smaller value or a greater value as necessary.

In step S14, after the temperature at which the sum of the charging current capable of being supplied to the battery 13 at the temperature-increasing target temperature and the current consumed by the temperature-increasing device 15 while decreasing the unit is less than or equal to the current capable of being supplied by the OBC 11 is confirmed, the temperature obtained by adding the unit temperature at the confirmed temperature may be determined to be the temperature at which the charging current becomes insufficient (S15). In other words, since the charging current supplied to the battery does not decrease due to the temperature-increasing consumption current up to the temperature confirmed in the step S14, the charging current supplied to the battery 13 from the time when the temperature increases by the next unit temperature may be considered to be insufficient. The temperature at which the battery charging current determined in step S15 starts to be insufficient may be referred to as a current decrease start temperature.

Further, the controller 17 may be configured to estimate the charge amount up to the current decrease start temperature, the state of charge (SOC) of the battery 13 at the current decrease start temperature, the charge amount up to the temperature-increasing target temperature, and the state of charge (SOC) of the battery 13 at the temperature-increasing target temperature (S16). In step S16, the controller 17 may be configured to calculate the charge amount up to the current decrease start temperature using the temperature-increasing time by temperature section and the charging allowable current in each temperature section up to the current decrease start temperature, based on a table as shown in FIG. 2. In other words, the charge amount may be calculated by summing all the values obtained by multiplying the charging allowable current by temperature section by the temperature-increasing time.

In addition, in step S16, the controller 17 may be configured to obtain the SOC corresponding to the charge amount up to the calculated current decrease start temperature, and may be configured to add the obtained SOC to the battery SOC at the charging start time to obtain the SOC at the current decrease start temperature. When the ratio of the charge amount up to the current decrease start temperature to the total capacity of the battery 13 is calculated as a percentage and the calculated ratio is added to the battery SOC at the charging start time, the battery SOC (hereinafter, referred to as 'first SOC') at the current decrease start temperature may be derived.

Further, in step S16, the controller 17 may be configured to obtain the charge amount from the current decrease start temperature to the temperature-increasing target temperature, based on the table as shown in FIG. 2. Particularly, the charge amount from the current decrease start temperature to the temperature-increasing target temperature may be determined by obtaining values from decreasing the temperature-increasing consumption current with respect to the charging allowable current in each temperature section, multiplying the temperature-increasing time by temperature section by the obtained values, and then adding the multiplied values. The controller 17 may be configured to calculate the amount of charge up to the temperature-increasing target temperature by adding the charge amount from the current decrease start temperature to the temperature-increasing target temperature to the charge amount up to the current decrease start temperature.

Additionally, in step S16, the controller 17 may be configured to calculate the ratio of the charge amount up to the temperature-increasing target temperature to the total capacity of the battery 13 as a percentage, and add the calculated ratio to the battery SOC at the charging start time to derive the battery SOC (hereinafter, referred to as 'second SOC') at the temperature-increasing target temperature. The controller 17 may then be configured to compare the first SOC with the targeted SOC provided from a driver (S17). When the targeted SOC is less than the first SOC, that is, before the targeted SOC reaches the temperature at which the charging current becomes insufficient, the controller 17 may be configured to turn off the temperature-increasing device 15 when the targeted SOC is reached to set the temperature increase to be terminated and estimate the time until the targeted SOC is reached (S18).

In the step S18, the targeted charge amount corresponding to the value obtained by subtracting the current SOC of the battery 13 from the targeted SOC may be calculated, and the value obtained by multiplying the charging allowable current by the temperature-increasing time may be accumulated while gradually increasing the unit temperature from the current temperature based on the table as shown in FIG. 2. The total temperature-increasing time up to the temperature at which the accumulated value starts to exceed the targeted charge amount may be determined as the predicted charging time (the time until the targeted SOC is reached).

If the targeted SOC is equal to or greater than the first SOC in step S17, the controller 17 may be configured to compare the targeted SOC with the second SOC (S19). If the targeted SOC is less than the second SOC in step S19, the temperature-raising device 15 may be turned off when the current decrease start temperature is reached to set the temperature increase to be terminated and the time until the targeted SOC is reached may be estimated (S20). If the temperature-increasing device 15 is turned off when the current decrease start temperature is reached, the temperature-increasing consumption current becomes zero, and thus, the charging allowable current may be supplied to the battery 13. Therefore, in step S20, the predicted charging time may be determined in the same manner as in step S18.

On the other hand, if the targeted SOC is equal to or greater than the second SOC in step S19, the considerable temperature increase is required, and therefore the controller 17 may be configured to set the temperature-increasing device 15 to operate up to the temperature-increasing target temperature (S21). In addition, in step S21, the controller 17 may be configured to calculate the targeted charge amount that corresponds to the value obtained by subtracting the current SOC of the battery 13 from the targeted SOC based on the table as shown in FIG. 2, accumulate the value obtained by multiplying the charging allowable current by the temperature-increasing time from the current temperature to the current decrease start temperature while gradually increasing the value, add the multiplication of the charging allowable current at the current decrease start temperature and the total temperature-increasing time up to the temperature-increasing target temperature at the current decrease start temperature to the accumulated value, and accumulate the value obtained by multiplying the charging allowable current and the temperature-increasing time while gradually increasing the unit temperature at the temperature-increasing target temperature in the added value, to thus determine the total temperature-increasing time up to the temperature at which the accumulated value starts to exceed the targeted charge amount as the predicted charging time.

As described above, according to various exemplary embodiments of the present disclosure, in response to predicting that the charging current supplied to the battery will be insufficient due to the current consumed in the operating temperature-increasing device when the battery is charged at a low temperature, the SOC when the charging current starts to be insufficient and the SOC at the temperature-increasing target temperature are estimated and the on/off time of the temperature-raising device may be determined in consideration of the relationship between the estimated SOCs and the preset targeted SOC, and the battery charge expected time may be calculated accordingly. As a result, the temperature-increasing device may be turned on/off to perform proper charging based on the targeted SOC of the battery, and the temperature-increasing device is unnecessarily operated up to the temperature-increasing target temperature to prevent the charging time delay due to the insufficient charging current and efficiently perform the battery charging.

While the disclosure has been shown and described with respect to the specific exemplary embodiments thereof, it will be apparent to those skilled in the art that various modifications and variations may be made in the present disclosure within the scope of the claims.

What is claimed is:

1. A method for charging a battery at a low temperature in a battery system including a charger providing power for charging the battery and a temperature-increasing device generating heat using the power provided from the charger to increase a temperature of the battery, the method comprising:

receiving, by a controller, the temperature of the battery, a state of charge (SOC) of the battery, and a targeted state of charge of the battery when the charging of the battery starts;

confirming, by the controller, a temperature-increasing target temperature of the battery based on the temperature of the battery and confirming a charging allowable current capable of being provided to the battery at the temperature-increasing target temperature;

comparing, by the controller, a sum of the charging allowable current at the temperature-increasing target temperature and a temperature-increasing consumption current of the temperature-increasing device at the temperature-increasing target temperature with a magnitude in a possible supply current of the charger;

estimating, by the controller, a first temperature at which the current provided to the battery is less than a preset charging allowable current based on the comparison result;

determining, by the controller, a time when an operation of the temperature-increasing device is turned off based on a comparison result of the state of charge of the battery when the battery is charged up to the first temperature and the state of charge of the battery when the battery is charged up to a charging target temperature with the targeted state of charge and calculating a charging time required when the battery is charged up to the targeted state of charge; and receiving and storing, by the controller, information in advance regarding the charging allowable current and a charging upper limit voltage capable of being provided to the battery when the battery is charged, the temperature-increasing target temperature of the temperature-increasing device based on the temperature of the battery, a temperature-increasing time required to increase a unit temperature when the temperature-increasing device is operated based on temperature of the battery.

2. The method of claim 1, wherein, when the sum of the charging allowable current of the battery and the current consumed by the temperature-increasing device at the temperature-increasing target temperature exceeds the current capable of being supplied by the charger, the sum of the charging allowable current and the temperature-increasing consumption current of the temperature-increasing device is compared with the magnitude in the possible supply current of the charger at a temperature reduced by a unit temperature from the temperature-increasing target temperature and a temperature at which the sum of the charging allowable current and the temperature-increasing consumption current of the temperature-increasing device is less than the magnitude in the possible supply current of the charger is determined.

3. The method of claim 2, wherein a temperature obtained by adding the temperature at which the sum of the charging allowable current and the temperature-increasing consumption current of the temperature-increasing device is less than the magnitude of the possible supply current of the charger to the unit temperature is determined as the first temperature.

4. The method of claim 1, wherein the temperature-increasing consumption current is derived by temperature by dividing a predetermined temperature-increasing power of the temperature-increasing device by a predetermined charging upper limit voltage of the battery.

5. The method of claim 1, wherein the calculating of a charging time includes:

predicting, by the controller, a first charge amount and a first state of charge of the battery corresponding to when the battery is charged up to the first temperature and a second charge amount and a second state of charge of the battery corresponding to when the battery is charged up to the charging target temperature;

comparing, by the controller, the first state of charge and the second state of charge with the targeted state of charge;

first determining, by the controller, a turn off time of the temperature-increasing device as a charging ending time in response to determining that the targeted state of charge is less than the first state of charge;

second determining, by the controller, the temperature of the turn off time of the temperature-increasing device as a time when the temperature of the battery reaches the first temperature in response to determining that the targeted state of charge is greater than or equal to the first state of charge or less than the second state of charge; and third determining, by the controller, the turn off time of the temperature-increasing device as a time when the temperature of the battery reaches the targeted temperature-increasing temperature in response to determining that the targeted state of charge is greater than or equal to the second state of charge.

6. The method of claim 5, wherein the first charge amount is calculated by summing values obtained by multiplying a temperature-increasing time by the temperature of the battery by the charging allowable current by the temperature, respectively when the temperature-increasing device is operated from the temperature of the battery to the first temperature, and the first state of charge is calculated by calculating a ratio of the first charge amount to a total capacity of the battery as percentage and adding the calculated ratio to the state of charge of the battery.

7. The method of claim 6, wherein the second charge amount is calculated by summing values obtained by multiplying the temperature-increasing time by the temperature of the battery by the charging allowable current by the temperature, respectively when the temperature-increasing device is operated from the first temperature to the temperature-increasing target temperature and then adding the summed value to the first charge amount, and the second state of charge is calculated by calculating a ratio of the second charge amount to the total capacity of the battery as the percentage and adding the calculated ratio to the state of charge of the battery.

8. The method of claim 5, wherein in a first determination:

a targeted charge amount corresponding to a value obtained by subtracting the state of charge of the battery received from the targeted state of charge is calculated, and a value obtained by multiplying the charging allowable current at the corresponding temperature by the temperature-increasing time by the temperature of the battery when a the temperature-increasing device is operated while increasing the temperature value of the battery is accumulated, and a total of accumulated time up to a temperature at which an accumulated value starts exceeding the targeted charge amount is calculated as a predicted charging time.

9. The method of claim 5, wherein in a second determination:

a targeted charge amount corresponding to a charge amount value obtained by subtracting the state of charge of the battery received from the targeted state of charge is calculated, and charge amount values obtained by multiplying the charging allowable current at the corresponding temperature by the temperature-increasing time by temperature of the battery when the temperature-increasing device is operated while increasing the temperature value of the battery are accumulated, and a total of accumulated time up to a temperature at which an accumulated charge amount accumulated value starts exceeding the targeted charge amount is calculated as a predicted charging time.

10. The method of claim 5, wherein in a third determination:
- a targeted charge amount corresponding to a value obtained by subtracting the state of charge of the battery received from the targeted state of charge is calculated,
- a first accumulated value is generated by accumulating a value obtained by multiplying the charging allowable current at the corresponding temperature by the temperature-increasing time by the temperature of the battery when the temperature-increasing device is operated while increasing the temperature value of the battery to a first temperature,
- a second accumulated value is generated by adding to the first accumulated value a value obtained by multiplying the charging allowable current at the first temperature by a value obtained by adding the temperature-increasing time by temperature from the first temperature to the temperature-increasing target temperature, and
- a third accumulated value is generated by accumulating values obtained by multiplying the charging allowable current at the corresponding temperature by the temperature-increasing time while increasing the temperature value of the temperature-increasing target temperature by the second accumulated value, and a total of accumulated time up to a temperature at which the third accumulated value starts exceeding the targeted charge amount is calculated as a predicted charge time.

* * * * *